US 6,560,178 B2

(12) United States Patent
Lee et al.

(10) Patent No.: US 6,560,178 B2
(45) Date of Patent: May 6, 2003

(54) TILT COMPENSATION METHOD AND APPARATUS THEREFOR

(75) Inventors: Kyung-geun Lee, Gyeonggi-do (KR); In-sik Park, Gyeonggi-do (KR); Jung-wan Ko, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/989,058

(22) Filed: Nov. 21, 2001

(65) Prior Publication Data

US 2002/0126605 A1 Sep. 12, 2002

(30) Foreign Application Priority Data

Jan. 9, 2001 (KR) ............................................ 2001-1129

(51) Int. Cl.⁷ ................................................. G11B 3/90
(52) U.S. Cl. ................................ 369/53.19; 369/47.28; 369/47.5; 369/59.12
(58) Field of Search ........................... 369/47.15, 47.28, 369/47.35, 47.5, 47.51, 53.12, 53.14, 53.13, 53.19, 59.11, 59.12, 124.14

(56) References Cited

U.S. PATENT DOCUMENTS 6,291,047 B1 * 9/2001 Kobayashi et al. .......... 369/283
6,345,034 B1 * 2/2002 Kim ........................ 369/275.5

FOREIGN PATENT DOCUMENTS

JP          6-295458        10/1994

* cited by examiner

Primary Examiner—Paul W. Huber
(74) Attorney, Agent, or Firm—Staas & Halsey LLP

(57) ABSTRACT

In a tilt compensation method and an apparatus thereof, an apparatus that compensates for a tilt of a recordable and reproducible optical recording medium includes a tilt detector detecting a tilt of the optical recording medium and a recording compensator. The recording compensator compensates for a recording signal having a predetermined recording pattern by using a predetermined system according to the tilt detected by the tilt detector, in which the tilt detector detects a tilt with respect to an optical recording medium in which a tilt margin is greater than 0 and less than 0.0052 (0<tilt margin<0.0052) and the recording compensator compensates for the detected tilt. Thus, a desired size (length and width) of a mark can be recorded by controlling the power level and the recording time needed for recording according to the detected tilt. Also, the above method and apparatus are suitable for a high density optical disc system.

20 Claims, 5 Drawing Sheets

| Pw \ TILT, ITEMS TO BE MEASURED | 0° | 0.5° | 1.0° |
|---|---|---|---|
| 6mW — SHIFT OF RECORDING POSITION | 0 | 0.293 | NOT RECORDED |
| 6mW — LENGTH | 0.515 | 0.439 | NOT RECORDED |
| 6mW — WIDTH | 0.231 | 0.174 | NOT RECORDED |
| 7mW — SHIFT OF RECORDING POSITION |  | 0.262 |  |
| 7mW — LENGTH |  | 0.496 |  |
| 7mW — WIDTH |  | 0.214 |  |
| 8mW — SHIFT OF RECORDING POSITION |  | 0.245 | 0.704 |
| 8mW — LENGTH |  | 0.535 | 0.090 |
| 8mW — WIDTH |  | 0.242 | 0.051 |
| 9mW — SHIFT OF RECORDING POSITION |  |  | 0.700 |
| 9mW — LENGTH |  |  | 0.372 |
| 9mW — WIDTH |  |  | 0.107 |

TILT COMPENSATION METHOD AND APPARATUS THEREFOR

CROSS-REFERENCE TO RELATED APPLICATIONS

This application claims the benefit of Korean Patent Application No. 2001-1129 filed on Jan. 9, 2001, in the Korean Industrial Property Office, the disclosure of which is incorporated herein by reference.

BACKGROUND OF THE INVENTION

1. Field of the Invention

The present invention relates to a tilt compensation method and an apparatus therefor, and more particularly, to a method of compensating for the tilt of an optical recording medium in which the tilt margin is between 0 and 0.0052, that is, 0<tilt margin<0.0052, and an apparatus used therefor.

2. Description of the Related Art

When an optical disc such as a DVD or a CD-RW used for high density recording is tilted, an error is generated during recording or reproducing data according to a degree of tilt. When the disc is tilted severely, recording or reproducing of data itself is difficult.

Table 1 below shows how margin changes, with respect to the characteristic of light and the change in tilt and thickness of an optical disc at a data recording surface thereof, according to a change in numerical aperture (NA), may affect a process of recording data on the optical disc. As shown in the table, when the numeral aperture increases, a spot size decreases so that the data recording capacity is increased. However, it is also shown that the depth of focus and margin of disc tilt are reduced.

TABLE 1

| Item | Degree of effect | NA 0.6 | NA0.65 | NA0.85 | NA0.66→ NA0.85 |
|---|---|---|---|---|---|
| Diameter of spot (relative size) | $\lambda/NA$ | 1 | 0.93 | 0.70 | Capacity increases twice. |
| Focus depth (relative depth) | $\lambda/NA^2$ | 1 | 0.85 | 0.50 | Servo control bandwidth increases twice. |
| Disc tilt (relative margin amount) | $\lambda/tNA^3$ | 1 | 0.79 | 0.35 | Strict about disc tilt margin |
| Change in thickness of disc (relative margin) | $\lambda/NA^4$ | 1 | 0.73 | 0.25 | Strict about margin of thickness during disc manufacturing |

A new optical disc named as a DDCD (double density CD) has been suggested. The DDCD uses the same wavelength as the wavelength used for an existing CD while using an objective lens having a larger NA and having a small track pitch. Also, the NA of a DDCD is different from that of an existing DVD (digital versatile disc).

Thus, a tilt margin of the DDCD is clearly different from that of the existing CD or DVD. Table 2 shows the characteristics of a CD, a DDCD and a DVD. In Table 2, the NA of the DDCD is 0.50 for reading only, that is, for reproducing only and 0.55 when used for both reading and recording. The NA of the CD is 0.45 for reading only and 0.50 when used for both reading and recording. The NA of the DVD is 0.60 when used for both reading only and reading and recording together. It can be seen that the NA of the DDCD is greater than that of the existing CD and less than the existing DVD.

TABLE 2

| Classification | CD-ROM/R/RW | DDCD | DVD (single side, single layer) |
|---|---|---|---|
| Diameter | 120 mm | | |
| Capacity | 650 MB | 1.3 GB | 4.7 GB |
| $\lambda$ | 780 nm | 780 nm | 650 nm |
| NA (reproducing/recording, reproducing) | 0.45/0.50 | 0.50/0.55 | 0.60 |
| Spot size ($\lambda/NA$) | 1.73/1.56 | 1.56/1.42 | 1.08 |
| Track itch (TP) | 1.6 Fm | 1.1 Fm | 0.74 Fm/0.615 Fm |
| Thickness | 1.2 mm | 1.2 mm | 0.3 mm |
| MML (maximum mark length) | 0.833 Fm | 0.623 Fm | 0.40 Fm/0.42 Fm |
| TP/Spot size | 0.92/1.03 | 0.71/0.77 | 0.69/0.57 |
| Relative TP/Spot size | | 0.77/0.75 (compared to CD) 1.03/1.35 (compared to DVD) | |
| MML/Spot size | 0.48/0.53 | 0.40/0.44 | 0.37/0.39 |
| Relative MML/Spot size | | 0.83/0.83 (compared to CD) 1.08/1.13 (compared to DVD) | |

Table 3 below shows the result of calculation of tilt margin with respect to a CD, DDCD and DVD by using a mathematical formula ($\lambda/tNA^3$; where "t" denotes the thickness of a disc) indicating a tilt margin.

TABLE 3

| Classification | DDCD Margin (reproduction/recording, reproduction) | | Remark (calculation formula) |
|---|---|---|---|
| | CD standard | DVD standard | |
| tilt | 0.73/0.75 | 1.04/0.78 | $\lambda/tNA^3$ |
| thickness deviation | 0.66/0.68 | 2.49/1.70 | $\lambda/NA^4$ |
| defocus | 0.81/0.83 | 0.97/1.00 | $\lambda/NA^2$ |

TABLE 3-continued

| Classification | DDCD Margin (reproduction/recording, reproduction) | | Remark (calculation formula) |
| --- | --- | --- | --- |
| | CD standard | DVD standard | |
| noise | 1.23/1.21 | 0.40/0.49 | $\left(\frac{\lambda_1 NA_2}{\lambda_2 NA_1}\right)^2 \times \left(\frac{\lambda_1}{\lambda_2}\right)$ |

It can be seen from Table 3 that the tilt margin of a DDCD is less than that of a CD and 22% less than that of a DVD. Such a fact can also be seen from FIG. 1.

Figure 1:
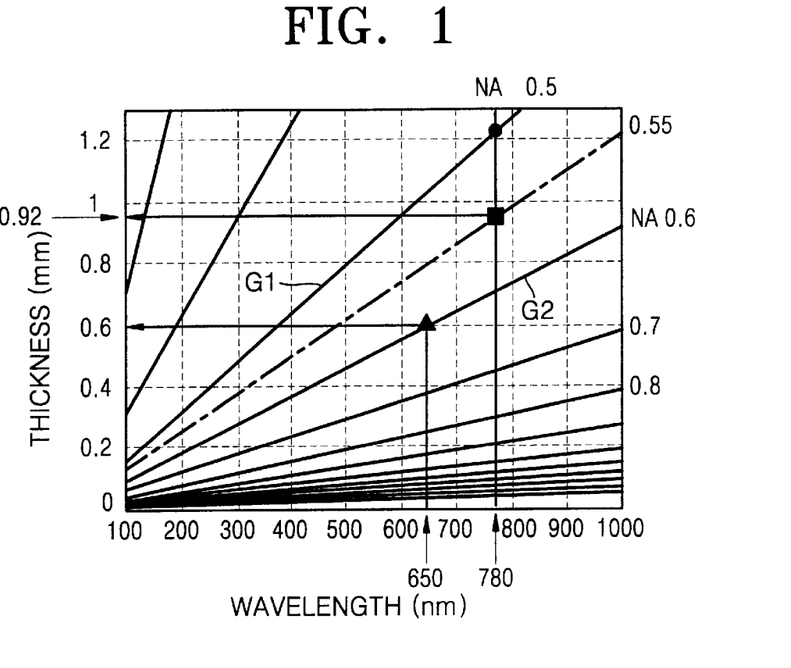
FIG. 1 is a graph showing lines indicating the same tilt margins for optical media as that of a DVD by NAs according to thickness and wavelength.

In detail, FIG. 1 is a graph showing the cases of different NAs which may have the same tilt margin as that of a DVD. In the graph, the horizontal axis denotes wavelength (nm) and the vertical axis denotes the thickness of an optical disc (mm). The first and second lines G1 and G2 indicate a change of the tilt margin of a CD-R/RW when the NA is 0.5 and a change of the tilt margin of a DVD when the NA is 0.6, respectively. In FIG. 1, all lines indicating different NAs show the same tilt margins. For example, the tilt margins indicated by the first and second lines G1 and G2 are the same.

The NA of a DDCD is 0.55 for recording and reproducing, and a graph corresponding to this condition is indicated by a projection line which is positioned between the first and second lines G1 and G2. Thus, if the tilt margin of a DDCD having a NA of 0.55 is the same as that of a DVD, since the wavelength of a DDCD is 780 nm, the thickness of the DDCD must be about 0.92 mm. However, since the thickness of a DDCD is actually 1.2 mm, the tilt margin of the DDCD naturally decreases, which can be seen from the above mathematical formula. Therefore, since the tilt margin of DDCD is different from that of CD or DVD, correction for this difference is needed.

SUMMARY OF THE INVENTION

Accordingly, it is an object of the present invention to provide a tilt compensation method by which recording is performed by controlling power and/or time needed for recording according to the tilt of an optical recording medium.

It is another object of the present invention to provide a method that adaptively compensates for a recording pulse according to the detected tilt of an optical recording medium.

It is yet another object of the present invention to provide a tilt compensating apparatus which performs recording by controlling power and/or time needed to record according to the tilt of an optical recording medium.

It is yet another object of the present invention to provide a tilt compensating apparatus to adaptively compensate for a recording pulse according to the detected tilt of an optical recording medium.

The foregoing and other objects of the present invention are achieved by providing a method that compensates for a tilt of a recordable and reproducible optical recording medium comprising detecting a tilt of the optical recording medium, and compensating for a recording signal having a predetermined recording pattern by using a predetermined system according to the detected tilt, wherein, when detecting the tilt, the tilt is detected with respect to an optical recording medium in which a tilt margin is greater than 0 and less than 0.0052 (0<tilt margin<0.0052).

The foregoing and other objects are also achieved by providing a method that compensates for a tilt of an optical recording medium when input data is recorded as a mark and a space by a recording pulse having a predetermined recording pattern. The method comprises detecting a tilt of the optical recording medium, and adaptively compensating for the recording pattern according to the detected tilt by using a memory, where a recording power and/or time compensating for the amount of shift of the recording pattern and the length and width of a mark according to the tilt and/or the length of the mark is stored, wherein, during detecting the tilt, the tilt is detected with respect to an optical recording medium in which a tilt margin is greater than 0 and less than 0.0052 (0<tilt margin<0.0052).

The foregoing and other objects may also be achieved by providing an apparatus that compensates for a tilt of a recordable and reproducible optical recording medium comprising a tilt detector detecting a tilt of the optical recording medium, and a recording compensator compensating for a recording signal having a predetermined recording pattern by using a predetermined system according to the tilt detected by the tilt detector, wherein the tilt detector detects the tilt with respect to an optical recording medium in which a tilt margin is greater than 0 and less than 0.0052 (0<tilt margin<0.0052) and the recording compensator compensates for the detected tilt.

The foregoing and other objects may also be achieved by providing an apparatus that compensates for a tilt of an optical recording medium when input data is recorded as a mark and a space by a recording pulse having a predetermined recording pattern, the apparatus comprising a tilt detector detecting a tilt of the optical recording medium, and a recording compensator adaptively compensating for the recording pattern according to the tilt detected by the tilt detector by using a memory where a recording power and/or time compensating for the amount of shift of the recording pattern and the length and width of a mark according to the tilt and/or the length of the mark is stored, wherein the tilt detector detects the tilt with respect to an optical recording medium in which a tilt margin is greater than 0 and less than 0.0052 (0<tilt margin<0.0052) and the recording compensator compensates for the detected tilt.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

In detail, when a tilt is generated with respect to an optical recording medium, for example, a DDCD which is recordable or recordable/reproducible, since the strength of the peak of the incident beam is reduced, a compensation for recording power is needed, and a predetermined amount of erasing power should also be compensated for.

Also, as can be seen from Table 2, since the conventional CD has a spot size smaller than a DDCD, an increase of the beam spot size according to tilt is relatively less than that of a DDCD. This means that, at the same tilt angle, the spot size of a DDCD is greater than that of the existing CD.

As described above, a DDCD has not only a reduced beam peak strength, but also an increased beam spot size, compared to the conventional CD, so that power density is reduced. Accordingly, the spot size of a DDCD rapidly increases according to a tilt and the power density decreases compared to the conventional CD, which means the maximum temperature is reduced.

Next, a change in the shape of a recording mark on the DDCCD according to the recording power, when there is a tilt, is described. That is, when there is a tilt, as a wavelength used for recording is shorter, reduction in length and width of the recording mark is greater. At the same wavelength, as the recording power increases, both the length and width of the mark increase.

As described above, it can be seen that, when a tilt is generated with respect to a DDCD, both the length and width of the recording mark are compensated for as the recording power is compensated for. Thus, a state in which a tilt is zero degrees (tilt=0E) can be accomplished by performing compensation. This compensation can be achieved by utilizing a recording strategy for controlling a recording waveform by a multi-waveform with respect to recording data applied to an optical disk system and using the recording power as well as the erasing power.

Meanwhile, compensation may be performed by using recording time according to the detected tilt. For example, compensation in a lengthwise direction of the recording mark can be performed by controlling the recording time. Thus, compensation according to the tilt is performed by using the power level and time needed for recording, so that a mark having the desired length and width can be recorded.

Also, in the relationship between the length and time of a recording mark according to the tilt, as the tilt increases, the length of the recording mark decreases when a wavelength is short, and at a single wavelength, the length of the recording mark increases as the recording time increases. Thus, the length of the recording mark according to the tilt can be compensated for by controlling the recording time.

Also, in the relationship between the width of the recording mark and the recording time according to the tilt, as the tilt increases, the width of the recording mark decreases when a wavelength is short, and when the wavelength is the same, the width of the recording mark increases as the recording time increases.

As described above, both the length and width of the recording mark can be made longer or shorter according to the increase or decrease in the recording time. Thus, the recording mark according to the tilt can be appropriately compensated for according to the length or width thereof. Since the width of the recording mark is affected by the tilt more than the length of the recording mark, it is preferable to compensate for the length of the recording mark in the compensation of a recording mark using the recording time.

Figure 2:
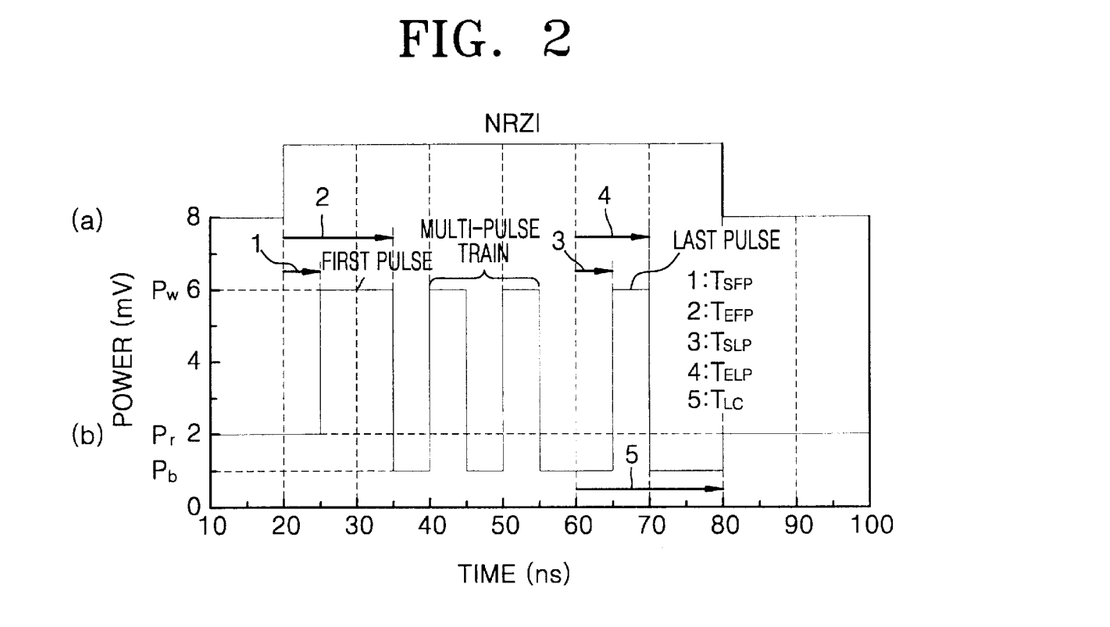
FIG. 2 is a timing diagram in which portions (a) and (b) show the recording pattern of a recording pulse used for the tilt compensating method according to an embodiment of the present invention.

Referring to FIG. 2, input NRZI (non return to zero inversion) data, as shown in portion (a), is recorded on a disc by forming a recording pulse, as shown in portion (b). Here, the NRZI data, as classified by a mark and a space and a laser diode (not shown), becomes an off state during the space period. The length of the NRZI data varies according to a disc used. For example, in the case of a DVD, the NRZI data has the length of 3T, 4T, . . . , 14T (T is the length of one bit) and is recorded by changing only the number of multi-pulses without changing the first pulse, the last pulse, and a cooling pulse. That is, a recording pattern of a recording pulse according to the DVD standard includes a first pulse, a multi-pulse train, and a last pulse. The rising edge of the first pulse of a basic recording pulse is delayed a predetermined time from the rising edge of the recording mark. The rising edges of the first and last pulses can be shifted before and after by units of one ns (nanosecond). The multi-pulse train is divided into many short pulses to reduce heat accumulated at a rear end portion of the recording mark so that the recording mark is not deformed. Such a recording type may be applied to a DDCD.

In the portion (b) of FIG. 2, reference numeral 1 denotes a start time $T_{SFP}$ of the first pulse, reference numeral 2 denotes an end time $T_{EFP}$ of the first pulse, reference numeral 3 denotes a start time $T_{SLP}$ of the last pulse, reference numeral 4 denotes an end time $T_{ELP}$ of the last pulse, and reference numeral 5 denotes a cooling pulse period $T_{LP}$. Also, Pw denotes recording power (so called as peak power), Pr denotes reproducing power, and Pb denotes bias power (so called erasing power).

When the input NRZI data is formed as a mark and a space on a disc by using a recording pulse having a recoding pattern shown in the portion (b) of FIG. 2, the start point of a recorded mark is shifted by the beam shift due to a tilt. To compensate for the shift, a shift of the recording pattern according to the tilt is needed.

Figure 3:
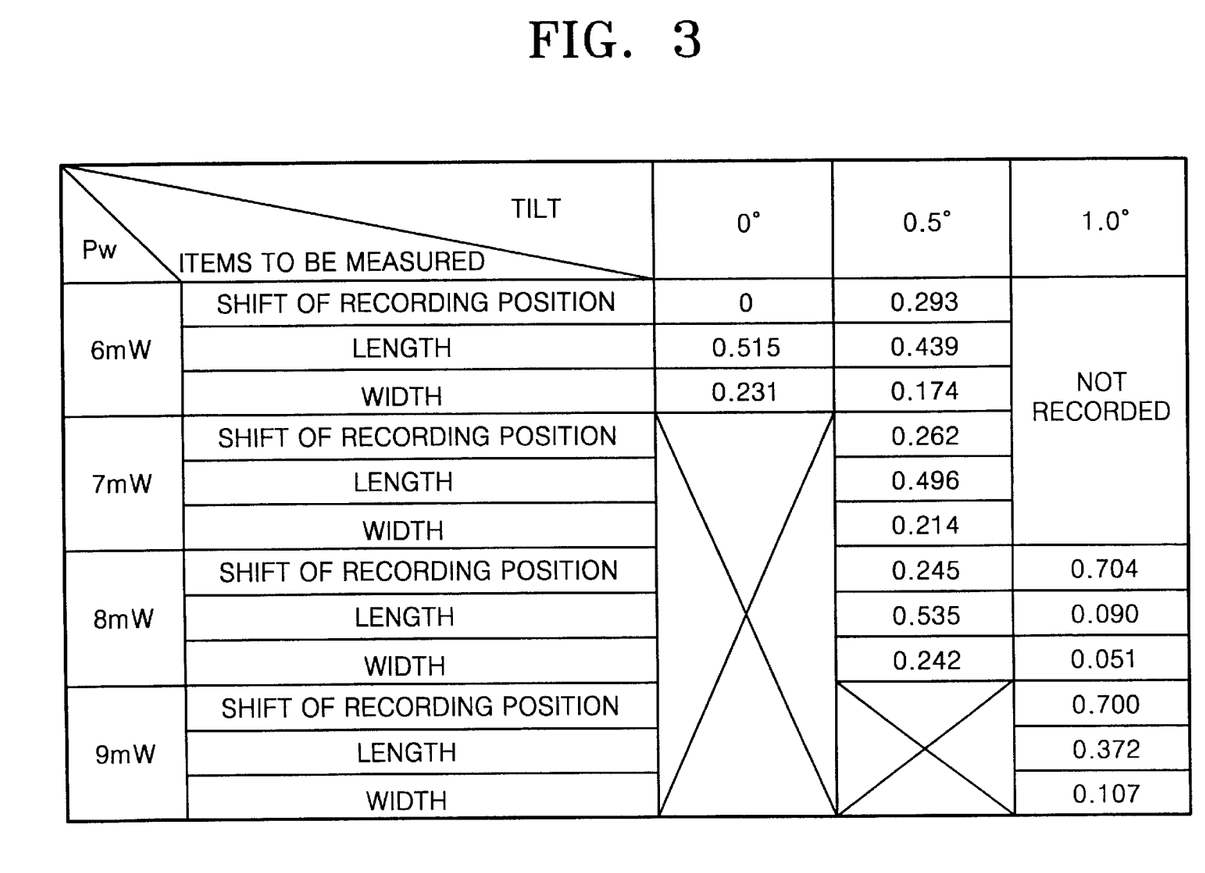
FIG. 3 is a table showing the amount of shift of a recording pulse and a change in the length and width of a recording mark by recording power according to the tilt.

FIG. 3 shows a change of the recording pattern of FIG. 2 by the recording power according to a tilt, that is, the recording position, the amount of shift, the length and width of the mark according to the tilt and the recording power. It can be seen that as the tilt increases, the amount of shift at the recording position of the mark increases and the length and width of the mark increases. As shown in FIG. 3, since the optimal recording power is 6 mW when the tilt is 0E, a recording power greater than 6 mW is meaningless. When the tilt is 1.0E, recording is not possible with recording powers of 6 mW and 7 mW.

Figure 4:
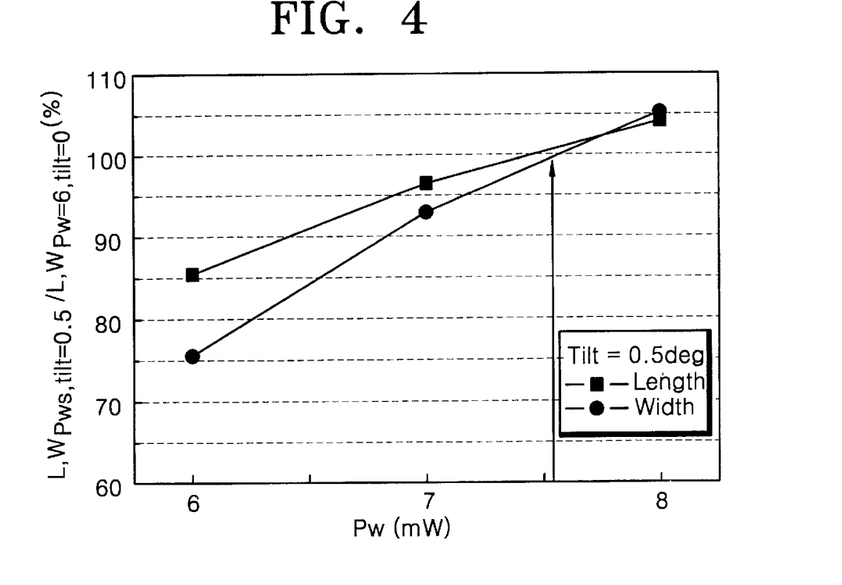
FIG. 4 is a view showing the effect of compensation for the length and width of the recording mark by the recording power at a tilt of 0.5E.

FIG. 4 shows the effect of compensation for a recording pattern (the length and width of a mark) by the recording power when the tilt is 0.5E, based on the result of FIG. 3. The horizontal axis denotes recording power Pw. The vertical axis denotes normalization $(L, W_{PwS,\ tilt=0.5}/L, W_{Pw=6,\ tilt=0})$ of the length and width of a recording mark according to the recording powers when the tilt is 0.5E with respect to the length and width of a recording mark when the recording power is 6 mW and the tilt is 0E.

It can be seen that, when a tilt exists (tilt is 0.5E), the length and width of the mark increase as the recording power increases, and that the length of the mark is effectively compensated for according to the recording power. For example, when the recording power is 6 mW, since the length of the mark corresponds to 85% and the width of the mark corresponds to 75%, it can be seen that it is more effective to compensate for the length of the mark than the width of the mark with respect to the same recording power.

Figure 5:
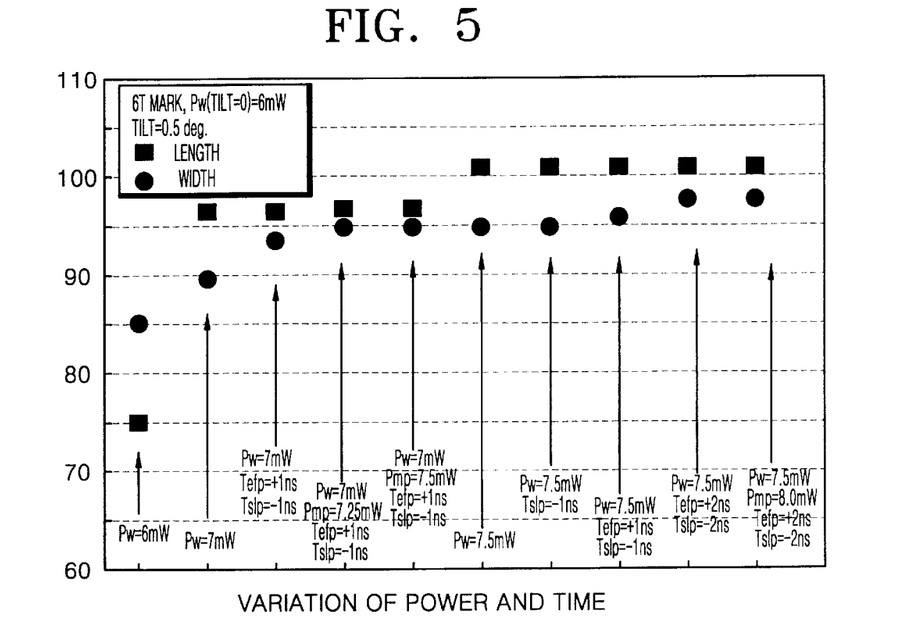
FIG. 5 is a view showing the effect of compensation for the length and width of the recording mark by the recording power and a change in the recording time at a tilt of 0.5E.

FIG. 5 shows the effect of compensation for a recording pattern not only by the recording power but also by the recording time when the tilt is 0.5E, based on the result of FIG. 4. It can be seen that it is effective to control the compensation for the length of the mark by the recording power and to compensate for the width of the mark by the recording time. In particular, the width of the mark is compensated for by the end time ($T_{EFP}$) of the start pulse and/or the start time ($T_{SLP}$) of the last pulse of the recording pattern shown in the portion (b) of FIG. 2. When the tilt is compensated for by the recording power only, the width of the mark can be compensated for by controlling the recording power of the multi-pulse present between the start pulse and the last pulse.

Compensation can be adaptively performed according to the detected tilt by previously storing the recording power and/or recording time for compensating for the length and width of the mark and the shift amount of a recording pattern according to the tilt based on the result shown in FIG. 3. Also, in addition to the tilt, the recording power and/or recording time for compensating for the length and width of the mark and the shift amount of the recording pattern according to the recording pattern (the length of the mark) of input data can be stored in the memory.

Figure 6:
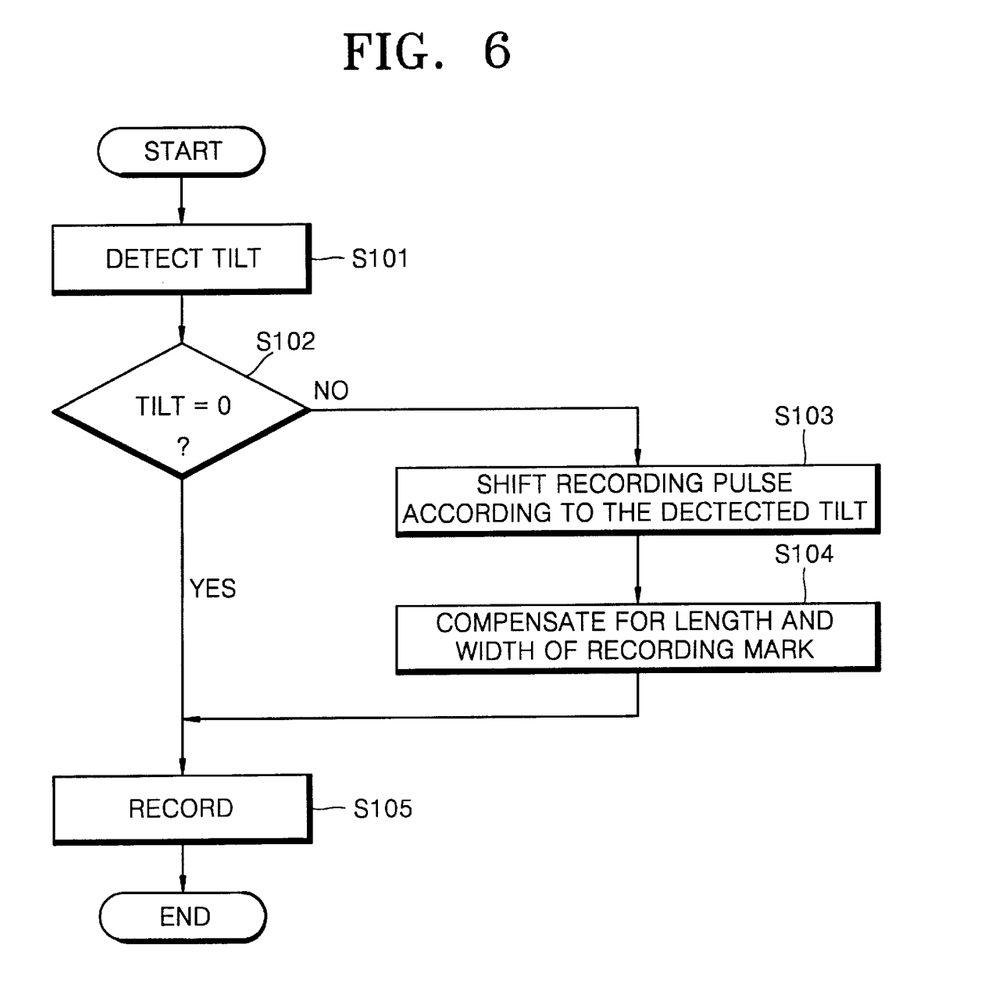
FIG. 6 is a flow chart explaining the tilt compensation method according to an embodiment of the present invention.

FIG. 6 is a flow chart explaining a tilt compensation method for an optical recording medium according to an embodiment of the present invention. Referring to FIG. 6, in the first operation (S101), a tilt for an optical recording medium having a tilt margin greater than 0 and less than 0.0052, for example, a DDCD, is detected. In Table 2 (supra), considering that the NA of a DDCD during recording and reproducing is 0.55, which is greater than the NA for the conventional CD and less than that of the conventional DVD, and that the tilt margin is inversely proportional to the cube of the NA, it can be seen that the tilt margin of a DDCD is less than the maximum tilt margin of the conventional CD-RW, that is, a tilt margin (0.0052) when the NA is 0.50. Thus, the tilt margin of a DDCD is within a range that is greater than the minimum value of 0 and less than the maximum value of 0.0052. That is, 0<tilt margin ($\lambda/(NA^3 t)$) <0.0052. The NA of DDCD can be set to be the same as or greater than the NA of the existing DVD within the above range. Also, there may be other optical recording media having such an NA, and a tilt can be detected with respect to this optical recoding medium.

Next, in the second operation (S102), it is determined whether the detected tilt is zero (tilt=0E). In the third operation (S103), when the detected tilt is not zero, the recording pattern of the recording pulse is shifted according to the detected tilt in a direction in which the tilt is compensated for. In the fourth operation (S104), the length and width of the recording mark is compensated for by the above shift so that the tilt approaches zero.

That is, the compensation of the length of the mark is controlled by the recording power, and the compensation of the width of the mark is controlled by the recording time. In particular, the compensation is performed by using the end time $T_{EFP}$ of the first pulse and/or the start time $T_{SLP}$ of the last pulse in the recording pattern. Also, when a tilt is compensated for by the recording power only, the compensation of length of the mark can be controlled by the recording power and the compensation of the width of the mark can be controlled by the recording power of the multi-pulse between the first pulse and the last pulse.

In the fifth operation (S105), when the tilt is determined to be zero in the second operation (S102), the power and recording time needed for the mark recording provided by the laser diode are maintained as they are to perform the mark recording, or the mark is recorded by applying a recording pulse having the power and/or recording time needed for the mark recording to the laser diode according to the detected tilt provided in the fourth operation (S104).

In the third and fourth operations (S103 and S104), the detected tilt can be adaptively compensated for by using a memory where the shift amount of the recording pattern according to the length of a mark of tilt/input data and the recording power and/or recording time for compensating for the length and width of the mark are stored.

Figure 7:
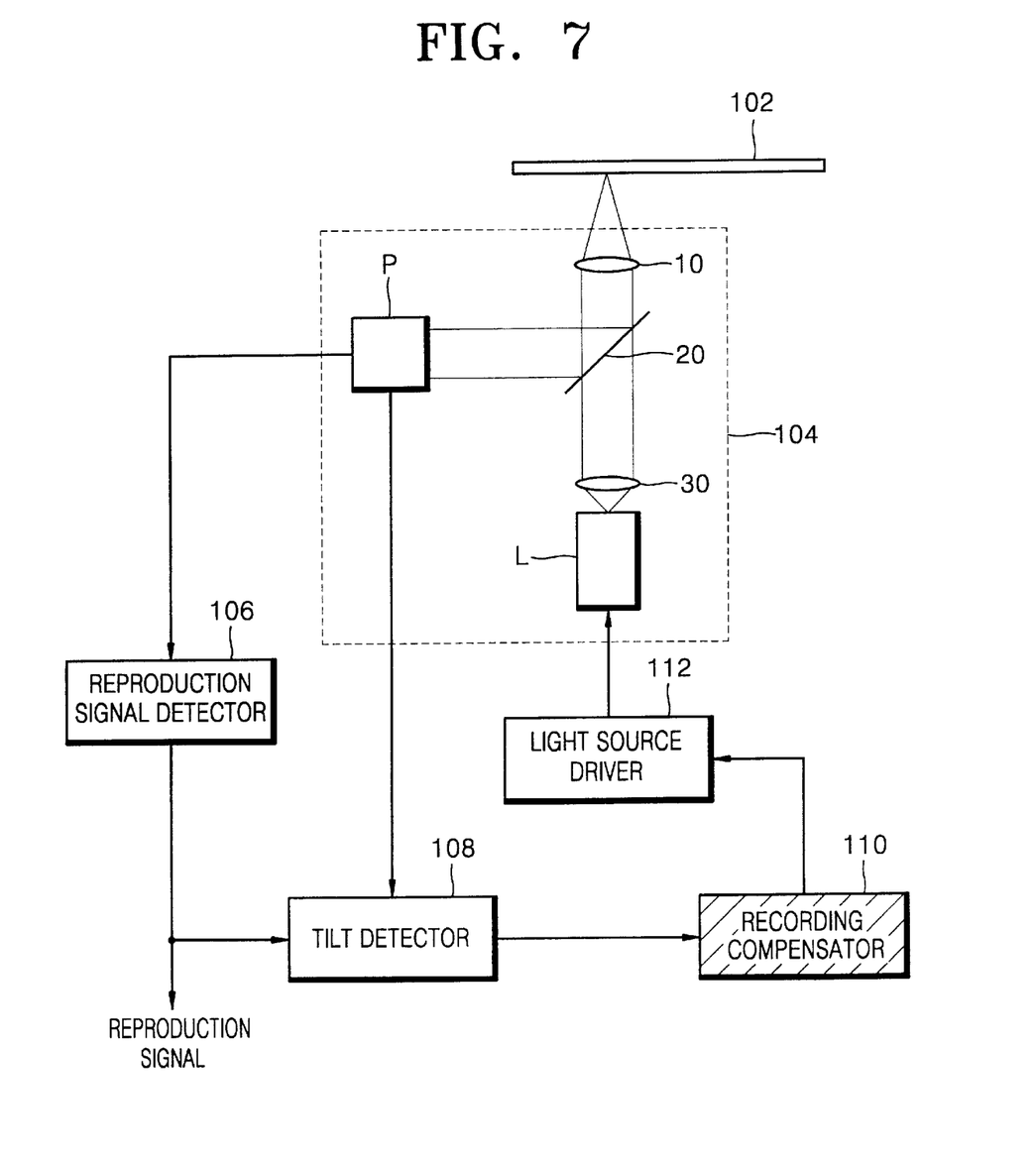
FIG. 7 is a block diagram of a tilt compensating apparatus according to an embodiment of the present invention.

FIG. 7 is a block diagram showing the configuration of a tilt compensation apparatus according to an embodiment of the present invention. In the drawing, reference numeral 102 denotes an optical disc, for example, a DDCD, reference numeral 104 denotes a pickup unit, reference numeral 106 denotes a reproduction signal detector, reference numeral 108 denotes a tilt detector, reference numeral 110 denotes a recording compensator, reference numeral 112 denotes a light source driver driving a light source L to emit light, for example, a laser beam used to record data on or read data from the optical disc 102. The light source L is preferably a laser diode, particularly, a laser diode capable of emitting a laser beam having a wavelength of 780 nm which can be used for a DDCD. However, other laser diodes which can emit a laser beam having a different wavelength can be used.

In FIG. 7, the pickup unit 104 to record data on or read data from the optical disc 102 comprises an optical system including an objective lens 10, a translucent mirror 20, and a collimating lens 30 to change the light emitted from the light source L to a parallel beam, and a mechanism including a photodetector P, for example, a photodiode, to detect an optical signal reflected from the optical disc 102 by dividing the optical signal into multiple signals, the light source L, and an actuator (not shown) performing focusing and tracking.

As an embodiment, a laser diode emitting light having a wavelength of 780 nm is used as the light source L of the pickup unit 104, and an objective lens having an NA of 0.55 is used when the thickness of a substrate of the optical disc 102 is 1.2 mm.

The reproduction signal detector 106 detects a reproduction signal from an output signal of the photodetector P. The tilt detector 108 detects a tilt of the optical disc 102, that is, the tilt of a DDCD, in which a tilt margin is 0<tilt margin<0.0052, by using the reproduction signal provided from the reproduction signal detector 106 or the output signal of the photodetector P. The tilt detector 108 may detect only a tilt in a track direction (tangential tilt).

The recording compensator 110 generates a recording pulse as early as the shifted amount according to the tilt detected by the tilt detector 108 to shift the start point of a recording mark in a direction in which the tilt is compensated for according to the tilt. Also, the compensation of the length of the mark is controlled by the recording power while the compensation of the width of the mark is controlled by the recording time. Here, the width of the mark is compensated for by the end time $T_{EFP}$ of the start pulse and/or the start time $T_{SLP}$ of the last pulse of the recording pattern. Also, when the tilt is compensated for by the recording power only, the compensation of the length of the mark is controlled by the recording power as above and the width of the mark can be compensated for by controlling the recording power of the multi-pulse between the start pulse and the last pulse.

Also, the recording compensator 110 includes a memory (not shown) where the recording power and/or recording time for compensating for the shift amount of the recording pattern is stored, and the length and width of the mark according to the tilt of the DDCD having the recording margin, as stated above, is stored. Thus, the tilt detected by the tilt detector 108 can be adaptively compensated for. Also, not only the tilt, but also the shift amount of the recording pattern and the recording power and/or the recording time for compensating for the length and width of the mark according to the recording pattern (the length of the mark) of input data may be stored in the memory.

The light source driver 112 changes a recording pulse to current as much as the recording control time according to the power level of the recording pulse generated from the recording compensator 110, so that the current flows to the light source L, and recording on the optical disc 102 is performed by the pickup unit 104. That is, the light source L is continuously turned on and off to apply heat to the optical disc 102 so that recording data is recorded as a recording mark.

As described above, in the tilt compensation method according to the present invention and the apparatus therefor, a mark having a desired size (length and width) can be recorded by controlling the power level and/or recording time required for recording according to a detected tilt, in particular, a tilt of an optical recording medium, for example, a DDCD, in which a tilt margin in a track direction is greater than 0 and less than 0.0052. Thus, the tilt compensation method according to the present invention and the apparatus therefor are suitable for a high density optical disc system.

Although preferred embodiments of the present invention have been shown and described, it will be appreciated by those skilled in the art that changes may be made in these embodiments without department from the principle and spirit of the invention, the scope of which is defined in the appended claims and their equivalents.

What is claimed is:

1. A method that compensates for a tilt of a recordable and reproducible optical recording medium comprising:
   detecting a tilt of the optical recording medium in which a tilt margin is greater than 0 and less than 0.0052 (0<tilt margin<0.0052); and
   compensating for a recording signal having a predetermined recording pattern by using a predetermined system according to the detected tilt.

2. The method as claimed in claim 1, wherein the predetermined system controls an optical power level needed for recording the recording signal.

3. The method as claimed in claim 1, wherein the predetermined system controls a time needed for recording the recording signal.

4. The method as claimed in claim 1, wherein the compensating for the recording signal comprises:
   shifting the recording pattern according to the detected tilt; and
   controlling power and/or time needed for recording to compensate for the size of a recording mark corresponding to the recording signal.

5. The method as claimed in claim 4, wherein a length of a mark to be recorded on the optical recording medium is compensated for by controlling the power needed for recording and a width of the mark is compensated for by controlling the time needed for recording.

6. The method as claimed in claim 5, wherein the length of the mark is compensated for by controlling the recording power and the width of the mark is compensated for by controlling an end time of a first pulse and/or a start time of a last pulse of a recording pattern.

7. The method as claimed in claim 4, wherein a length of a mark to be recorded on the optical recording medium is compensated for by controlling the recording power and a width of the mark is compensated for by controlling the recording power of a multi-pulse train of a recording pattern.

8. A method that compensates for a tilt of an optical recording medium when input data is recorded as a mark and a space by a recording pulse having a predetermined recording pattern, the method comprising:
   detecting a tilt of the optical recording medium in which a tilt margin is greater than 0 and less than 0.0052 (0<tilt margin<0.0052); and
   compensating for the recording pattern according to the detected tilt by using a memory where a recording power and/or time compensating for an amount of shift of the recording pattern and a length and a width of the mark according to the tilt and/or the length of the mark is stored.

9. A compensating apparatus that compensates for a tilt of a recordable and reproducible optical recording medium comprising:
   a tilt detector detecting a tilt of the optical recording medium in which a tilt margin is greater than 0 and less than 0.0052 (0<tilt margin<0.0052); and
   a recording compensator compensating for a recording signal having a predetermined recording pattern by using a predetermined system according to the tilt detected by the tilt detector.

10. The apparatus as claimed in claim 9, wherein the predetermined system controls an optical power level needed for recording the recording signal.

11. The apparatus as claimed in claim 9, wherein the predetermined system controls a time needed for recording the recording signal.

12. The apparatus as claimed in claim 9, wherein the recording compensator shifts the recording pattern according to the detected tilt and a length and a width of the mark is compensated for by the power and/or the time needed for recording.

13. The apparatus as claimed in claim 12, wherein the recording compensator compensates for the length of the mark by controlling the recording power and the width of the mark by controlling an end time of a first pulse and a start time of a last pulse of the recording pattern.

14. The apparatus as claimed in claim 12, wherein the recording compensator compensates for the length of the mark by controlling the recording power and the width of the mark by controlling power of a multi-pulse train of the recording pattern.

15. The apparatus as claimed in claim 9, further comprising a light source emitting a laser beam having a wavelength of 780 nm.

16. The apparatus as claimed in claim 9, wherein the optical recording medium is a DDCD and the numerical aperture (NA) is 0.55.

17. A compensating apparatus that compensates for a tilt of an optical recording medium when input data is recorded as a mark and a space by a recording pulse having a predetermined recording pattern, the apparatus comprising:

a tilt detector detecting a tilt of the optical recording medium in which a tilt margin is greater than 0 and less than 0.0052 (0<tilt margin<0.0052) and the recording compensator compensates for the detected tilt; and a recording compensator compensating for the recording pattern according to the tilt detected by the tilt detector by using a memory where a recording power and/or recording time compensating for an amount of shift of the recording pattern and a length and a width of the mark according to the tilt and/or the length of the mark is stored.

18. The method according to claim 5, wherein the length of the mark is compensated for by controlling the time needed for recording.

19. The method according to claim 7, wherein the multi-pulse train is divided into a plurality of short pulses.

20. The method according to claim 14, wherein the multi-pulse train is divided into a plurality of short pulses.

* * * * *